United States Patent
Ahmed et al.

(10) Patent No.: US 10,558,660 B2
(45) Date of Patent: Feb. 11, 2020

(54) REDUNDANT GROUP BY AND DISTINCT REMOVAL

(71) Applicant: Oracle International Corporation, Redwood Shores, CA (US)

(72) Inventors: Rafi Ahmed, Fremont, CA (US); Andrew Witkowski, Foster City, CA (US); Sankar Subramanian, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 175 days.

(21) Appl. No.: 15/658,249

(22) Filed: Jul. 24, 2017

(65) Prior Publication Data
US 2019/0026332 A1   Jan. 24, 2019

(51) Int. Cl.
*G06F 16/2453* (2019.01)

(52) U.S. Cl.
CPC .............................. *G06F 16/24537* (2019.01)

(58) Field of Classification Search
CPC .................................................. G06F 16/24537
See application file for complete search history.

(56) References Cited

U.S. PATENT DOCUMENTS

| | | | | |
|---|---|---|---|---|
| 5,598,559 A | * | 1/1997 | Chaudhuri | G06F 16/24537 |
| 5,659,728 A | * | 8/1997 | Bhargava | G06F 16/24537 |
| 2003/0078909 A1 | * | 4/2003 | Pham | G06F 16/24537 |
| 2003/0088558 A1 | * | 5/2003 | Zaharioudakis | G06F 16/24539 |
| 2015/0293968 A1 | * | 10/2015 | Dickie | G06F 16/2365 707/738 |
| 2016/0378827 A1 | * | 12/2016 | Bondalapati | G06F 16/24542 707/718 |
| 2017/0329823 A1 | * | 11/2017 | Attaluri | G06F 16/24542 |
| 2018/0075102 A1 | * | 3/2018 | Oppenheimer | G06F 16/2453 |
| 2018/0101573 A1 | | 4/2018 | Sheng | |

* cited by examiner

*Primary Examiner* — Richard L Bowen
(74) *Attorney, Agent, or Firm* — Hickman Palermo Becker Bingham LLP (57) ABSTRACT

A method, apparatus, and stored instructions are provided for the removal of redundant GROUP BY and/or DISTINCT. Every table in the FROM clause of the query block must be a qualified table for the GROUP-BY clause or the DISTINCT keyword in the SELECT clause of the query block to be removed. A table Tx that satisfies at least one of the following two conditions is referred to as a qualified table: (1) Tx has a non-null unique column Tx.u that appears on the GROUP BY clause or the SELECT clause that contains a DISTINCT keyword and (2) There is a qualified table Ty and Ty has a filtering join with Tx.

28 Claims, 3 Drawing Sheets

REDUNDANT GROUP BY AND DISTINCT REMOVAL

FIELD OF THE INVENTION

The present invention relates to database systems and, in particular, to optimization of queries executed by a database system.

BACKGROUND

Relational and object-relational database management systems store information in tables in a database. To retrieve data, queries that request data are submitted to a database server, which computes the queries and returns the data requested. Query statements submitted to the database server should conform to the syntactical rules of a particular query language. One popular query language, Structured Query Language (SQL), provides users a variety of ways to specify information to be retrieved.

A query submitted to a database server is evaluated by a query optimizer. Based on the evaluation, the query optimizer generates an execution plan that is optimized for efficient execution. The optimized execution plan may be based on a rewrite of the query into a semantically equivalent but more efficient form.

SQL supports DISTINCT clauses, which are used to return distinct values, and GROUP BY clauses, which are used in combination with aggregate functions to group result-sets by one or more columns.

Described herein are techniques for rewriting queries that contain GROUP BY and DISTINCT clauses so that such queries may be executed more efficiently.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Methods, stored instructions, and computer systems are provided for removing redundant GROUP BY and DISTINCT clauses. When conditions for redundant GROUP BY and DISTINCT clause removal are satisfied and such clauses are removed, a query may be transformed or otherwise rewritten to make the query more efficient to process. Thus, query execution time may be minimized and other database resources may be conserved.

In many applications, it is quite common to find queries that may have GROUP BY and DISTINCT clauses, aggregate functions, and some tables with unique columns that are referenced in the GROUP BY or WHERE clauses. Removal of redundant GROUP BY and DISTINCT clauses, as described herein, can provide an extremely significant performance gain for a large class of queries since GROUP BY and DISTINCT clauses, and aggregation functions are expensive operations.

In an embodiment, a query having a query block that includes a GROUP BY clause is evaluated to determine whether removal of a redundant GROUP BY may be performed. As used herein, the term "removal of redundant GROUP BY" refers to the removal, from a query block, of a GROUP BY clause and aggregate functions from the query block.

In one embodiment, a query having a query block that includes a DISTINCT SELECT clause that is evaluated to determine whether removal of a redundant DISTINCT may be performed. As used herein, the term "removal of redundant DISTINCT" refers to the removal, from a query block, of the DISTINCT keyword from SELECT clause and aggregate functions from the query block.

Uniqueness

A condition for establishing the redundancy for a GROUP BY or DISTINCT clause, as described herein, is that a column specified in the query is unique. A particular column is referred to as being unique when each row has a distinct value for the particular column. That is, being unique means that two rows cannot have identical values in a particular column. A column may be explicitly defined as unique by the database dictionary (e.g. the database dictionary defines a UNIQUE or PRIMARY KEY enforced constraint for the column). As described later, a column can also be implicitly defined as unique by a constraint defined by the database dictionary or may be unique within the context of a query under circumstances described later.

Non-Nullness

Another condition for establishing the redundancy for a GROUP BY or DISTINCT clause, as described herein, is that a column specified in the query is non-null. As used herein, in the context of describing a column of a query block, the term "non-null" refers to a column where the values in that column for all rows are not null. A column may be explicitly defined as non-null by the database dictionary (e.g. the database dictionary defines a NOT NULL or PRIMARY KEY enforced constraint for the column). As described later, a column can also be implicitly defined as NOT NULL by the appearance of the column in certain predicates (e.g. a column appears in a IS NOT NULL predicate), or may be non-null within the context of a query under circumstances described later.

As an example of why being non-null is important for a column specified in the query, if a UNIQUE constraint is placed on a particular column but the column is allowed to have multiple null values, a problem arises when executing a GROUP BY clause. In a particular column with ten rows filled with values: (1, 2, 3, 4, 5, null, null, null, 9, 10), one grouping as a result of the GROUP BY clause may consist of multiple null values and a particular group may not contain exactly one row. If a group formed by a GROUP BY clause contains more than one row, the uniqueness condition for removing a redundant GROUP BY is destroyed. Thus, the property of non-nullness is important when considering the redundancy of the GROUP BY clause.

Filtering Join

Another condition for establishing the redundancy for a GROUP BY or DISTINCT clause is whether a table is involved in a filtering join, which may also be referred to as unique-key preserving join. A table Tx has a filtering join with a table Ty, if there exists a simple equi-join predicate of the form Tx.c=Ty.u and the column Ty.u is unique. Note that the definition of filtering join is asymmetric. Due to the property that one column of the join is unique, that is, it contains only distinct values, the join condition guarantees that a row of Tx.c will not join with more than one row of Ty.u and thus the unique key, if any, of Tx will be preserved. Thus, between two tables in a filtering join, a single row from one table will join with, at most, one row of the other table. The join operation will not produce any duplicate rows for Tx, whose rows will either remain or be filtered out after the filtering join.

For example, if unique column Ty.u contains values: (1, 5, 7, 9) and Tx.c contains values: (1, 1, 5, 5, 5, 7), an equi-join between the two columns will produce the result set: (1, 1, 5, 5, 5, 7). Because Ty.u is unique, each value of Tx.c will only join with, at most, one row of Ty.u.

Other join predicates between Tx and Ty, if any, will not alter the above stated property, since they can be looked upon as post-join filter predicates. Additionally, from the above example, Ty is allowed to be an outer-joined table but Tx is not; that is, the outer-joined predicate, Tx.c=Ty.u (+) or (LEFT OUTER JOIN where Tx.c is preserved) is included in the above definition but Tx.c (+)=Ty.u (RIGHT OUTER JOIN where Ty.u is preserved) is not. Furthermore, semi-joins and anti-joins, by definition, are always filtering joins irrespective of the form of join predicates. Thus, tables that are included in a semi-join or anti-join do not need to be included in the determination of whether each table of the query block is a qualified table, as described herein.

As shall be explained in greater detail, conditions for removal can be based on whether a column has the UNIQUESS property or whether a join is a filtering join.

Redundant Group by Removal

A GROUP BY clause is considered redundant, if each group formed by the GROUP BY clause contains exactly one row. In such cases, grouping performs a redundant operation and therefore the GROUP BY clause and aggregate functions can be removed with certain caveats; the aggregate functions, if any, must return the input value or a constant when they operate upon one row. Thus, to establish redundancy, grouping must be done on one or more unique and non-null columns of some tables and the joins with the rest of the tables must be filtering joins.

A table Tx that satisfies at least one of the following two conditions is referred to as a qualified table:
(1) Tx has a non-null unique column Tx.u that appears as an argument of the GROUP BY clause.
(2) There is a qualified table Ty and Ty has a filtering join with Tx.

Every table in the FROM clause of the query block must be a qualified table for the GROUP-BY clause in the query block to be removed. For a query block that satisfies this condition, redundant GROUP BY removal can be performed because the grouping is executed on one or more unique and non-null columns of some tables and the joins with the remaining tables in the query block are filtering joins. In such cases, it can be established that each group formed by the GROUP BY clause contains exactly one row, and thus, grouping is unnecessary.

For example, consider example query Q1, provided below: (In all the following examples, a column named U implies a unique and non-null column.)
EXAMPLE QUERY Q1:
Q1=SELECT T1.U, COUNT(T2.z)
FROM T1, T2
WHERE T1.a=T2.b
GROUP BY T1.U, T2.U;

Example query Q1 contains tables T1 and T2. Each table has a non-null unique column T1.U and T2.U, respectively, which appear on the GROUP BY clause. Thus, each table of Q1 is qualified, since each table satisfies condition 1, and therefore, the GROUP BY clause and all aggregate functions can be removed. Q1 can be converted into the semantically equivalent Q1'.

TRANSFORMED QUERY Q1':
Q1'=SELECT T1.U, (CASE WHEN (T2.z IS NOT NULL) THEN 1 ELSE 0 END)
FROM T1, T2
WHERE T1.a=T2.b;

The result set of transformed query Q1' is identical to the result set of query Q1 because each table in the query block has a non-null unique column that appears as an argument GROUP BY clause, and thus, each group formed by the GROUP BY clause will contain exactly one row.

Consider query Q2, provided below:
EXAMPLE QUERY Q2:
SELECT T2.y, SUM(T2.z)
FROM T1, T2
WHERE T1.x=T2.U
GROUP BY T1.U, T2.y;

Example query Q2 contains table T1 which has a non-null unique column T1.U that appears as an argument of the GROUP BY clause. Table T1 is a qualified table because it satisfies condition 1. Table T2 also appears on the GROUP BY clause as T2.y, but T2.y is not a unique column. Thus, condition 1 is satisfied for T1 but not for T2. However, T1 has a filtering join with T2 because the unique column T2.U is equi-joined with T1.x. Because T1 has a filtering join with table T2, and T1 has already been determined to be a qualified table, T2 is also a qualified table by virtue of condition 2. Thus, each table of Q2 is a qualified table because each table satisfies at least one of the qualified table conditions and the GROUP BY clause and all aggregate functions are deemed redundant and can be removed. Q2 can be converted into the semantically equivalent Q2'.

TRANSFORMED QUERY Q2':
SELECT T2.y, T2.z
FROM T1, T2
WHERE T1.x=T2.U;

The result set of transformed query Q2' is identical to the result set of query Q2 because each group formed by unique column T1.U will produce exactly one row and because the unique key of T1.x is preserved, since it involves in a filtering join with T2 using a WHERE clause predicate.

Consider example query Q3, provided below:
EXAMPLE QUERY Q3:
SELECT T1.U, T2.y, MAX(T3.z), COUNT(*)
FROM T1, T2, T3
WHERE T1.x=T2.U and T2.c=T3.U
GROUP BY T1.U, T2.y;

Example query Q3 contains table T1 which has a non-null unique column T1.U that appears as an argument of the GROUP BY clause. T1 is a qualified table because it satisfies condition 1. Table T2 also appears on the GROUP BY clause, but T2.y is not a unique column. However, T1 has a filtering join with T2 on the WHERE clause because the unique column T2.U is equi-joined with T1.x. Because T1 has a filtering join with table T2, and T1 has already satisfied condition 1, T2 therefore satisfies condition 2. Additionally, Table T3 appears in the query block, but does not have a unique column that appears on the GROUP BY clause. However, T2 has a filtering join with T3 on the WHERE clause because the unique column T3.U is equi-joined with T2.c. Because T2 is a qualified table by virtue of satisfying condition 2, T3 satisfies condition 2 by involving in a filtering join with T2 on the WHERE clause. Therefore, all the tables in Q3 are determined to be qualified tables. Thus, the GROUP BY clause and all aggregate functions are deemed redundant and can be removed. Q3 can be converted into the semantically equivalent Q3'.

TRANSFORMED QUERY Q3':
SELECT T1.U, T2.y, T3.z, 1
FROM T1, T2, T3
WHERE T1.x=T2.U and T2.c=T3.U;

The result set of transformed query Q3' is identical to the result set of query Q3 because each group formed by unique column T1.U will produce exactly one row, because the unique key of T1.x is preserved by engaging in a filtering join with T2 via the WHERE clause, and because the unique key of T2 is preserved by being involved in a filtering join with T3.

Consider example query Q4, provided below:
EXAMPLE QUERY Q4:
SELECT T2.y, AVG(T3.z)
FROM T1, T2, T3
WHERE T1.x=T2.U and T1.c=T3.U
GROUP BY T1.U, T2.y
HAVING MIN(T2.b)>10;

Example query Q4 contains table T1 which has a non-null unique column T1.U that appears on the GROUP BY clause. Thus, T1 is a qualified table because it satisfies condition 1. Table T2 also appears as an argument of the GROUP BY clause, but T2.y is not a unique column. However, T1 has a filtering join with T2 because the unique column T2.U is joined with T1.x. Because T1 has a filtering join with table T2, and T1 has already been determined to be a qualified table, T2 therefore satisfies condition 2. Additionally, T1 has a filtering join with T3 because the unique column T3.U is joined with T1.c. Because T1 has a filtering join with table T3, and T1 has already been determined to be a qualified table, T3 therefore satisfies condition 2. Thus, the GROUP BY clause and all aggregate functions are deemed redundant and can be removed. Q4 can be converted into the semantically equivalent Q4'.

TRANSFORMED QUERY Q4'
SELECT T2.y, T3.z
FROM T1, T2, T3
WHERE T1.x=T2.U and T1.c=T3.U and T2.b>10;

The result set of transformed query Q4' is identical to the result set of query Q4 because each group formed by unique column T1.U will produce exactly one row and because the unique key of T1.x is preserved by engaging in filtering joins with T2 and T3 via the WHERE clause.

Redundant Distinct Removal

A DISTINCT keyword is considered redundant, if it can be established that the query block already contains a unique set of rows. In such cases, duplicate removal performs a redundant operation and therefore the DISTINCT keyword can be removed from the SELECT clause.

A table Tx in the query block that satisfies at least one of the following two conditions is referred to as a qualified table:

(1) Tx has a non-null unique column Tx.u that appears on the SELECT clause that contains the DISTINCT keyword.
(2) There is a qualified table Ty and Ty has a filtering join with Tx.

Every table in the FROM clause of the query block must be a qualified table for the DISTINCT clause in the query block to be removed. For a query block that satisfies the above conditions, redundant DISTINCT keyword removal can be performed because the distinct (that is, duplicate removal) is executed on one or more unique and non-null columns of some tables and there are filtering joins with the remaining tables in the query block. In such cases, it can be established that the rows of the query block are already distinct, and thus, the DISTINCT keyword is unnecessary.

Below, example queries Q5 and Q6 illustrate two syntactically different queries where Q5 includes a GROUP BY clause and Q6 includes a DISTINCT keyword. The queries include unique columns "T1.U" and "T2.U", and non-unique columns "T1.z", "T1.a", and "T2.y". If the SELECT clause of a query block includes all the items from the GROUP BY clause, then it is equivalent to having the DISTINCT keyword in the SELECT clause. Therefore, queries Q5 and Q6 are semantically equivalent. Example queries Q5 and Q6 include various clauses for illustration purposes; redundant DISTINCT and GROUP BY removal may be performed on a query that does not include the WHERE clause, and may include additional clauses.

EXAMPLE QUERY Q5:
SELECT T1.U, T1.z, T2.y
FROM T1, T2
WHERE T1.a=T2.U;
GROUP BY T1.U, T1.z, T2.y;
EXAMPLE QUERY Q6:
SELECT DISTINCT T1.U, T1.z, T2.y
FROM T1, T2
WHERE T1.a=T2.U;

In a query block, DISTINCT can always be represented as a GROUP BY. Therefore, the technique described for GROUP BY removal is also applicable to query blocks containing the DISTINCT keyword. For example, the DISTINCT keyword from the above mentioned query can be removed to form a more efficient query using the same technique described for GROUP BY query blocks.

Transformed query Q6' illustrates a semantically equivalent query to queries Q5 and Q6 where the GROUP BY clause and DISTINCT keyword have been removed.

TRANSFORMED QUERY Q6':
SELECT T1.U, T1.z, T2.y
FROM T1, T2
WHERE T1.a=T2.U;

In Q5 and Q6, the removal of the GROUP BY clause and DISTINCT keyword is possible because tables T1 and T2 of the query block are determined to be qualified tables, as they each satisfy one of the qualified table conditions. Table T1 has a unique and non-null column "T1.U" in the GROUP BY clause in Q5, which is equivalent to the SELECT clause with the DISTINCT keyword in Q6. Thus, T1 satisfies condition 1. Table T2 has a unique and non-null column "T2.U" that has a filtering join with column "T1.a" from table T1 in both queries Q5 and Q6. Thus, T2 satisfies condition 2. Thus, every table included in the query block satisfies a qualified table condition and the GROUP BY/DISTINCT clauses can be removed.

Inferring Uniqueness

As mentioned earlier, a column may be explicitly defined as unique, or a column's uniqueness may be inferred under various circumstances, such as being implicitly defined as unique by a constraint defined by the database dictionary (e.g. a column is key in a unique index), or being implicitly unique within the context of a query.

As an example of being unique within the context of a query, multiple columns can serve as a composite unique key; e.g., the columns (T1.c1, T1.c2) may serve as T1's composite primary key. If a subset of a composite unique key appears in the WHERE clause equated with constants, then a remaining column can be considered unique. Suppose there is a primary key (T1.c1, T1.c2) and 'T1.c1=5' appears in the WHERE clause of a query block, then T1.c2 can be treated as a unique key in that query block.

The following non-limiting list includes multiple other ways that it can be inferred that a column T.z is unique:
- The column T.z has a UNIQUE or PRIMARY KEY RELY constraint.
- The column T.z has a UNIQUE index.
- The column T.z is the only item on the SELECT clause of the view, which contains the DISTINCT key word.
- The column T.z appears on the SELECT list of view T that contains T.z as the only item on its GROUP BY clause.

Inferring Non-Nullness

As mentioned earlier, a column may be explicitly defined as non-null, or a column's non-nullness may be inferred under various circumstances, such as being implicitly defined as NOT NULL by the appearance of the column in certain predicates (e.g. a column appears in an IS NOT NULL predicate).

As an example of being non-null within the context of a query, the column 'T1.c1' can appear in different predicates throughout the query block and result in a non-null column. If 'T1.c1' appears in a filter predicate e.g. 'T1.c1>2', or a join predicate e.g. 'T1.c1=T2.c2', then the column can be considered non-null.

Figure 1A:
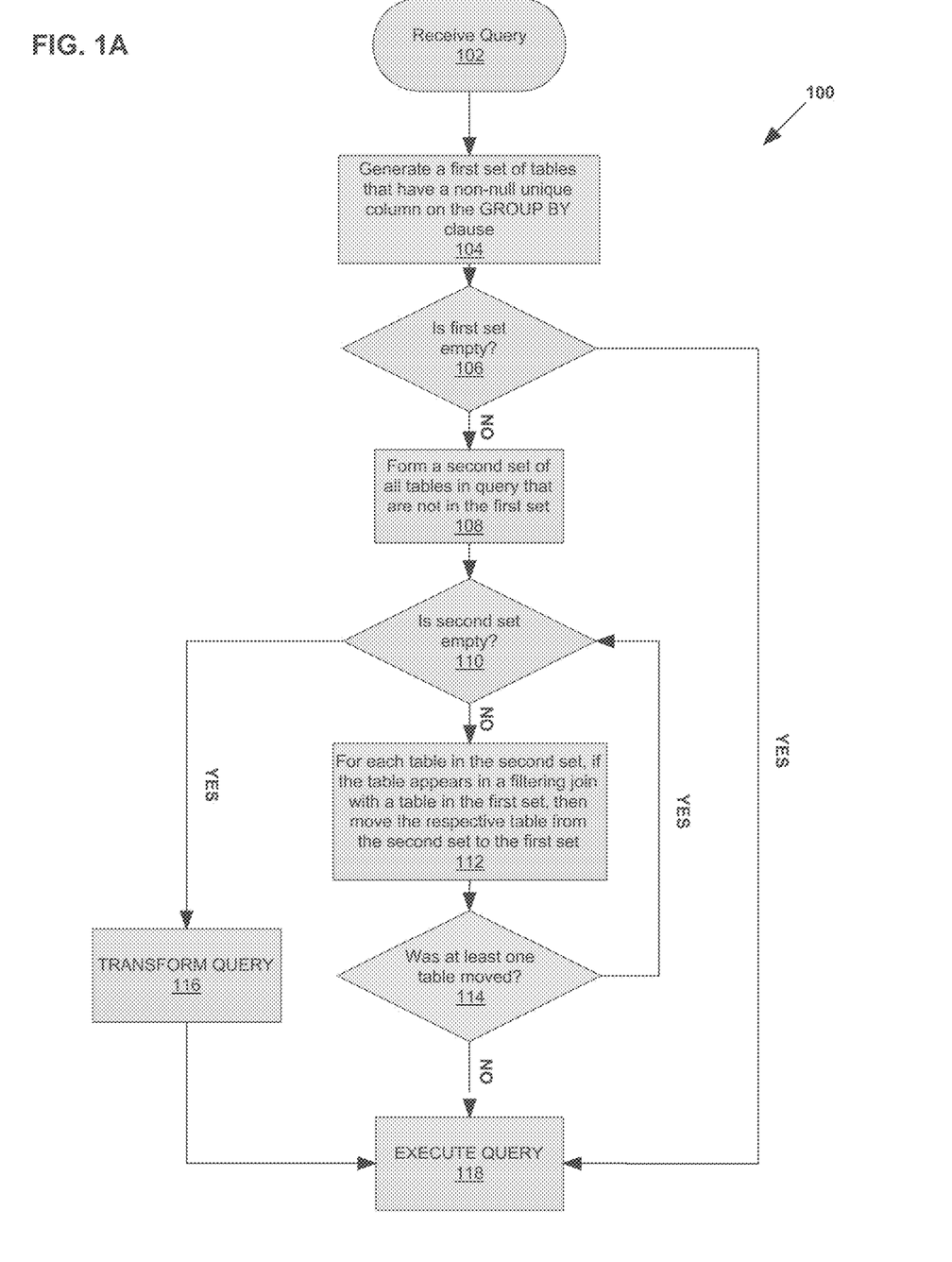
FIG. 1A is a flow diagram that illustrates an embodiment of a process for redundant GROUP BY clause elimination.

The following non-limiting list includes multiple other ways that it can be inferred that a column T.z is non-null:
- The column T.z has a NOT NULL or PRIMARY KEY RELY constraint.
- The column T.z appears in a 'IS NOT NULL' predicate.
- The column T.z appears in a filter predicate; e.g., T.z>5
- The column appears in a join predicate; e.g., T.z=R.c Method for Removal of Redundant Group-by FIG. 1A is a flow diagram that illustrates an embodiment of a process for the removal of redundant GROUP BY clauses. Process 100 may be performed by one or more computing devices, including but not limited to one or more database servers.

At block 102 a query comprising a query block is received. In one embodiment, the query is received or otherwise accessed by a query processor of a database server. The query block specifies a GROUP BY clause where columns from one or more tables are listed.

At block 104 a first set is generated consisting of one or more tables included in the query block that have a non-null unique column on the GROUP BY clause. In one embodiment, a first set includes all currently qualified tables. According to an embodiment, a set of tables, such as a first set of tables and second set of tables, may be generated in a variety of ways. For example, a set of tables may be represented as a list in memory containing table identifiers of each table in the set. A set of tables is generated by adding or removing respective table identifiers to the list. Alternatively, a query representation of a query may include data structures or elements that correspond to the tables in query. The data structures or elements are marked to indicate whether a respective table belongs to the first set and/or the second set. An embodiment of the present invention is not limited to any particular way of representing a set of tables.

At decision block 106 it is determined if the first set is empty, i.e. whether the first set contains at least one table. If it is determined that the first set is not empty, i.e., the first set does contain at least one table, processing proceeds to 108. Otherwise, if it is determined that the first set is empty, i.e., the first set does not contain at least one table, processing proceeds to 118.

At block 108 a second set is generated consisting of all the tables in the query block that are not included in the first set.

At decision block 110 it is determined if the second set is empty, i.e., whether the second set contains at least one table. If it is determined that the second set is not empty, i.e. the second set does contain at least one table, processing proceeds to 112. Otherwise, if it is determined that the second set is empty, i.e., the second set does not contain at least one table, processing proceeds to 116.

At block 112, for each table in the second set, the WHERE clause of the query block is examined for the condition where a table in the second set appears in a filtering join with a table from the first set. For each table in the second set that satisfies the condition, the respective table is moved from the second set to the first set. That is, the table becomes a qualified table.

At decision block 114 it is determined if at least one table was moved from the second set to the first set at block 112. If it is determined that at least one table was moved from the second set to the first set, processing proceeds to 110. Otherwise, if it is determined that no tables were moved from the second set to the first set at block 112, processing proceeds to 118.

At block 116, the original query is transformed into a modified query, wherein the GROUP BY clause and all aggregate functions are removed from the query block. Block 116 is reached when it is determined that the second set of tables is empty, after first determining that the first set is not empty.

At block 118, the query is executed. When it is determined that the second set of tables is empty after first determining that the first set of tables is not empty, the query is executed at block 118 after transforming the query by removing a redundant GROUP BY at block 116. Otherwise, the query is executed without transforming the query by removing a redundant GROUP BY.

Method for Removal of Redundant Distinct

Figure 1B:
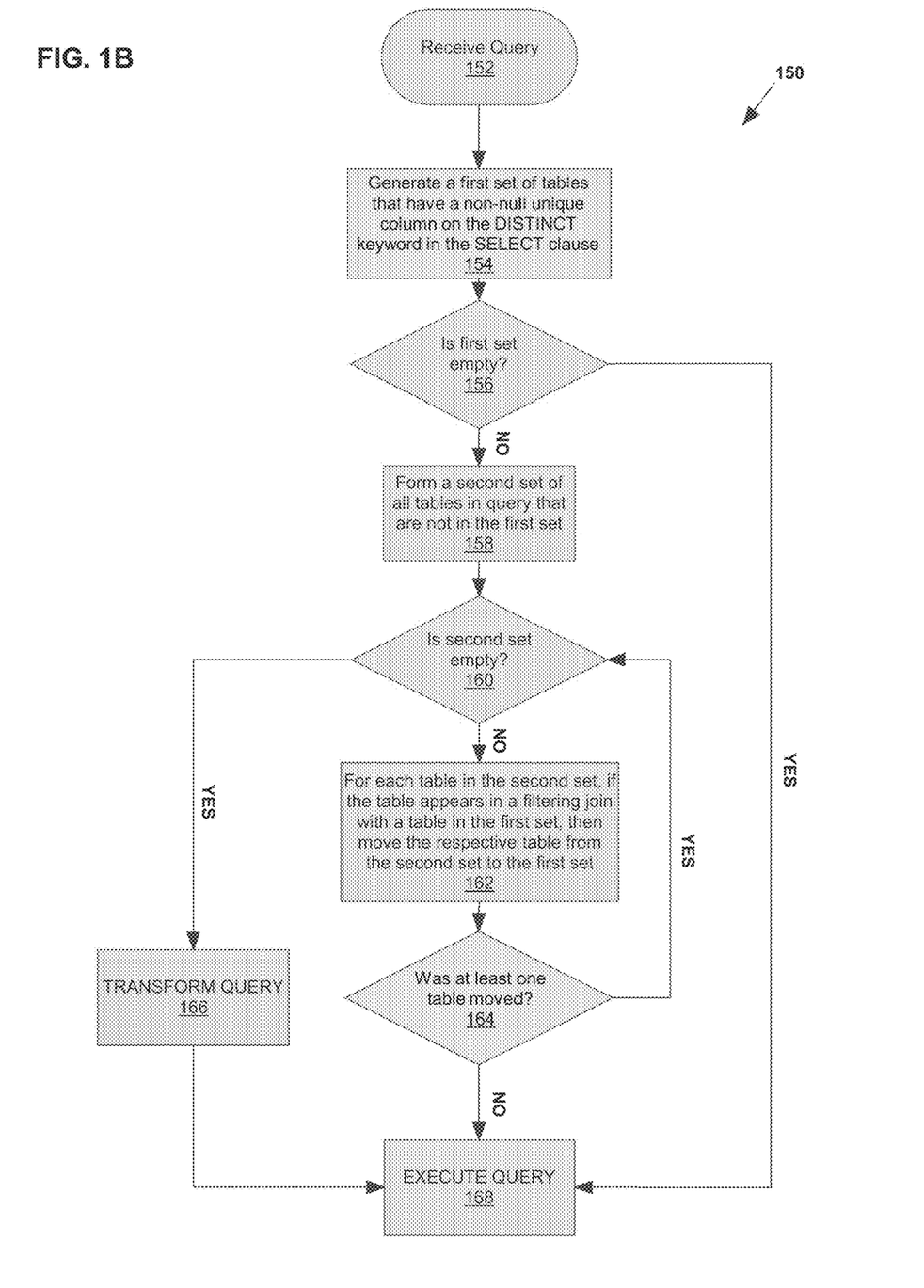
FIG. 1B is a flow diagram that illustrates an embodiment of a process for redundant DISTINCT clause elimination.

FIG. 1B is a flow diagram that illustrates an embodiment of a process for the removal of redundant DISTINCT clauses. Process 100 may be performed by one or more computing devices, including but not limited to one or more database servers.

At block 152 a query comprising a query block is received. In one embodiment, the query is received or otherwise accessed by a query processor of a database server. The query block specifies a SELECT clause with the DISTINCT keyword where columns from one or more tables are listed.

At block 154 a first set is generated consisting of one or more tables included in the query block that have a non-null unique column that appears on the SELECT clause. The first set includes all currently qualified tables. According to an embodiment, a set of tables, such as a first set of tables and second set of tables, may be generated in a variety of ways. For example, a set of tables may be represented as a list in memory containing table identifiers of each table in the set. A set of tables is generated by adding or removing respective table identifiers to the list. Alternatively, a query representation of a query may include data structures or elements that correspond to the tables in query. The data structures or elements are marked to indicate whether a respective table belongs to the first set and/or the second set. An embodiment of the present invention is not limited to any particular way of representing a set of tables.

At decision block 156 it is determined if the first set is empty, i.e., whether the first set contains at least one table. If it is determined that the first set is not empty, i.e. the first set does contain at least one table, processing proceeds to 158. Otherwise, if it is determined that the first set is empty, i.e., the first set does not contain at least one table, processing proceeds to 168.

At block 158 a second set is generated consisting of all the tables in the query block that are not included in the first set.

At decision block 160 it is determined if the second set is empty, i.e. whether the second set contains at least one table. If it is determined that the second set is not empty, i.e. the second set does contain at least one table, processing proceeds to 162. Otherwise, if it is determined that the second set is empty, i.e. the second set does not contain at least one table, processing proceeds to 166.

At block 162, for each table in the second set, the WHERE clause of the query block is examined for the condition where a table in the second set appears in a filtering join with a table from the first set. For each table in the second set that satisfies the condition, the respective table is moved from the second set to the first set; that is, the table becomes a qualified table.

At decision block 164 it is determined if at least one table was moved from the second set to the first set at block 162. If it is determined that at least one table was moved from the second set to the first set, processing proceeds to 160. Otherwise, if it is determined that no tables were moved from the second set to the first set at block 162, processing proceeds to 168.

At block 166, the original query is transformed into a modified query, wherein the DISTINCT keyword is removed from the query block. Block 166 is reached when it is determined that the second set of tables is empty, after first determining that the first set is not empty.

At block 168, the query is executed. When it is determined that the second set of tables is empty after first determining that the first set of tables is not empty, the query is executed at block 168 after transforming the query by removing a redundant DISTINCT at block 166. Otherwise, the query is executed without transforming the query by removing a redundant DISTINCT keyword.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and appears on the FROM clause and which represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Query Optimization

As used herein, a query is considered "transformed" when the query is (a) rewritten from a first expression or representation to a second expression or representation, (b) received in a manner that specifies or indicates a first set of operations, such as a first expression, representation, or execution plan, and executed using a second set of operations, such as the operations specified by or indicated by a second expression, representation, or execution plan, or (c) received in a manner that specifies or indicates a first set of operations, and planned for execution using a second set of operations.

Two queries or execution plans are semantically equivalent to each other when the two queries or execution plans, if executed, would produce equivalent result sets, even if the result sets are assembled in different manners by the two queries or execution plans. Execution of a query is semantically equivalent to a query or execution plan if the query execution produces a result set that is equivalent to the one that would be produced by that query or execution plan, if executed.

A query optimizer may optimize a query by transforming the query. In general, transforming a query involves rewriting a query into another query that produces the same result and that can potentially be executed more efficiently, i.e. one for which a potentially more efficient and/or less costly execution plan can be generated. A query may be rewritten by manipulating any internal representation of the query, including any copy thereof, to form a transformed query or a transformed query representation. Alternatively and/or in addition, a query may be rewritten by generating a different but semantically equivalent database statement.

Group by Clauses

A query may include an operation to group pieces of data. A GROUP BY clause groups a database query block result into subsets that have matching values for one or more columns. A GROUP BY clause causes the data specified in a query to be divided into different groups such that all rows in a given group have the same value for the key specified in the GROUP BY clause. GROUP BY clauses are typically used in conjunction with aggregate functions, thus allowing mathematical operations to be performed on columns specified as arguments in the aggregate functions.

Distinct Keyword

Another query operator is DISTINCT. A DISTINCT keyword appears on the SELECT clause and causes the elimination of duplicate rows in the specified set of data. Thus, a DISTINCT keyword can be used to return only distinct, or different, values.

Aggregate Functions

An important function for data generation and retrieval performed by a database management system is the generation of aggregated information. Aggregated information is information derived by applying an aggregate function to the values in a column of a subset of rows in a table or on the result of a join of two or more tables. Examples of aggregate functions are functions that sum values, calculate averages, and determine minimum and maximum values. The column that contains the values to which an aggregate function is applied is referred to as the measure.

The subsets of rows to which an aggregate function is generally applied are determined by values in "GROUP BY" columns. The aggregate information generated by a database management system is presented as a result set having the GROUP BY column(s) and the aggregated measure column. In particular, the result set has one row for each unique value in the GROUP BY column. Each row in the result set corresponds to the group of rows in the base table containing the value for the GROUP BY column of the row. The measure column in the row contains the output of the aggregate function applied to the values in the measure column of the group of rows.

In an embodiment, aggregate functions must be isomorphic for the GROUP BY clause to be removed. For example, the operators ROUND( ), TRUNC( ), and TRIM( ) are not isomorphic.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
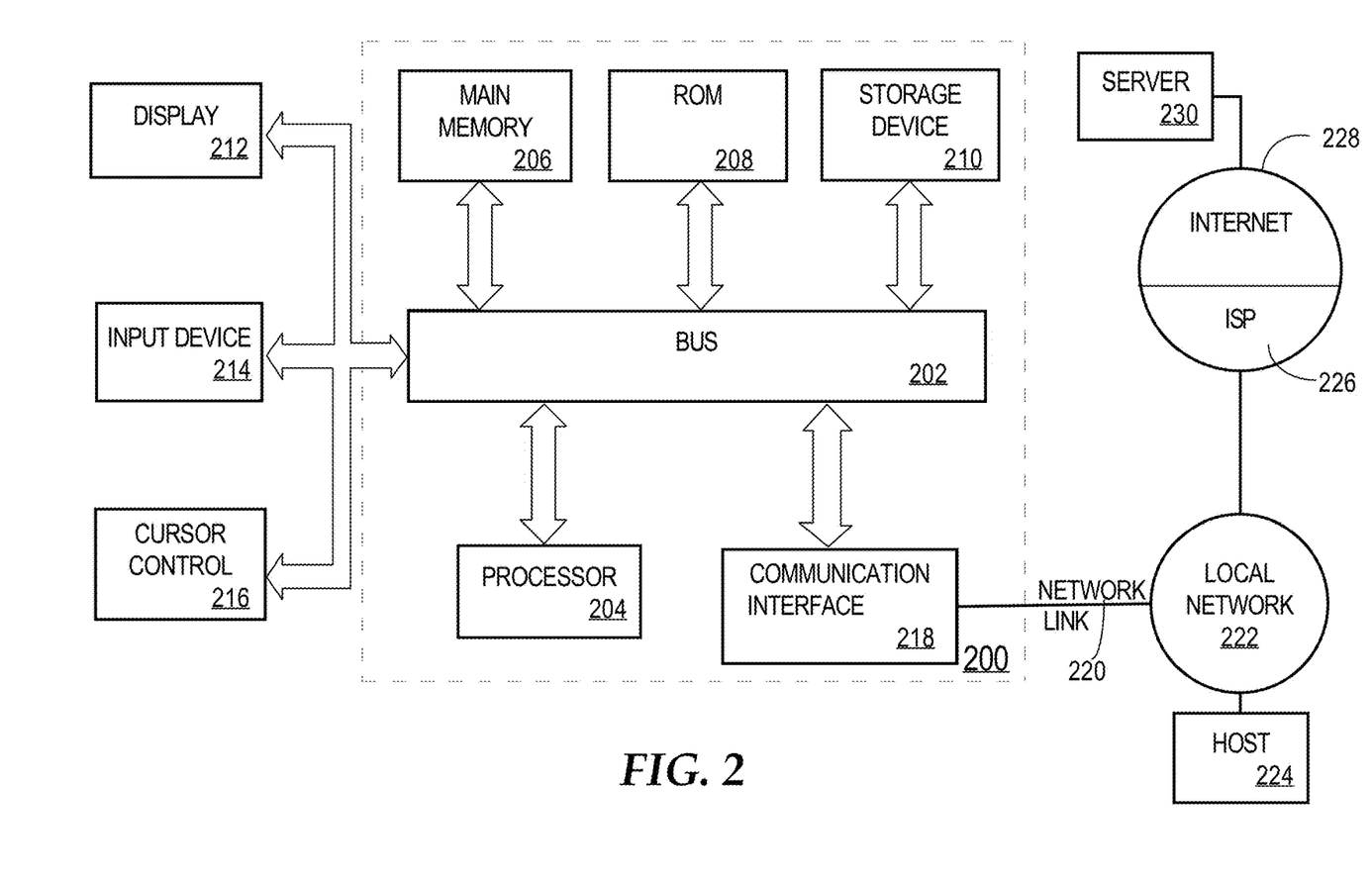
FIG. 2 illustrates a computer system upon which one or more embodiments may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk, optical disk, or solid-state drive is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 210. Volatile media includes dynamic memory, such as main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid-state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method of removing a GROUP BY clause from a query block of a query, comprising:
   determining whether each table of a plurality of tables of the query block is qualified,
   wherein said each table is qualified when said each table satisfies at least one of two conditions that consist of:
      said each table has a non-null unique column that appears on the GROUP BY clause, and
      there is a filtering join between said each table and another table of the plurality of tables that was determined to be qualified;
   in response to determining that each table of the plurality of tables is qualified, rewriting the query to generate a rewritten query, wherein rewriting the query includes removing the GROUP BY clause from the query block;
   wherein the method is performed by computing devices.

2. The method of claim 1, wherein the plurality of tables includes a first table with a first column, the method further including determining that said first column is unique based on:
   the first column having a UNIQUE index,
   a SELECT clause of a view only contains the first column qualified by a DISTINCT keyword, or
   the first column appears in a SELECT list of a view that includes a DISTINCT keyword that only contains the column.

3. The method of claim 1, wherein the plurality of tables includes a first table with a first column, the method further including determining that said first column is non-null based on:
   the first column is constrained by PRIMARY KEY RELY constraint,
   the first column is an argument of a IS NOT NULL predicate,
   the first column appears in a filter predicate, or
   the first column appears in a join predicate.

4. The method of claim 1, wherein
   said query block includes at least one aggregate function;
   wherein rewriting the query further includes removing the at least one aggregate function from the query block.

5. The method of claim 1, wherein
   said query block includes a semi-join or anti-join between two tables of the plurality of tables of the query block;
   wherein each table of the two tables is not included in the determination of whether each table of the plurality of tables of the query block is qualified.

6. The method of claim 1, wherein the plurality of tables includes a first table with a first column, wherein the filtering join comprises an equi-join between a particular column of the first table and a unique column of a second table.

7. The method of claim 6, wherein the second table is an outer joined table and the first table is not an outer joined table.

8. A method of removing a DISTINCT keyword from a query block of a query, comprising:
   determining whether each table of a plurality of tables of the query block is qualified,
   wherein said each table is qualified when said each table satisfies at least one of two conditions that consist of:
      said each table has a non-null unique column that appears on a SELECT clause that contains the DISTINCT keyword; and
      there is a filtering join between said each table and another table of the plurality of tables that was determined to be qualified;
   in response to determining that each table of the plurality of tables is qualified, rewriting the query to generate a rewritten query, wherein rewriting the query includes removing the DISTINCT keyword from the query block;
   wherein the method is performed by computing devices.

9. The method of claim 8, wherein the plurality of tables includes a first table with a first column, the method further including determining that said first column is unique based on:
   the first column having a UNIQUE index,
   a SELECT clause of a view only contains the first column qualified by a DISTINCT keyword, or
   the first column appears in a SELECT list of a view that includes a DISTINCT clause that only contains the column.

10. The method of claim 8, wherein the plurality of tables includes a first table with a first column, the method further including determining that said first column is non-null based on:
    the first column is constrained by PRIMARY KEY RELY constraint,
    the first column is an argument of a IS NOT NULL predicate,
    the first column appears in a filter predicate, or
    the first column appears in a join predicate.

11. The method of claim 8, wherein the plurality of tables includes a first table with a first column, wherein the filtering join comprises an equi-join between a particular column of the first table and a unique column of a second table.

12. The method of claim 8, wherein the method further comprises:
    said query block includes a semi-join or anti join between two tables of the plurality of tables of the query block;
    wherein each table of the two tables is not included in the determination of whether each table of the plurality of tables of the query block is qualified.

13. A method of removing a GROUP BY clause from a query block of a query, comprising:
    generating a first set of one or more first tables that have a non-null unique column on the GROUP BY clause;
    generating a second set of one or more second tables in the query block that are not included in the first set;
    for each second table in the second set:
       determining that the query block includes a filtering join with a first table in the first set and said each second table;
       in response to determining that the query block includes a filtering join with a first table in the first set and said each second table, moving said each second table from the second set to the first set;
    determining whether the second set is empty;
    in response to determining that the second set is empty, removing the GROUP BY clause and all aggregate functions from the query block;
    wherein the method is performed by one or more computing devices.

14. A method of removing a DISTINCT keyword from a query block of a query, comprising:
    generating a first set of one or more first tables that have a non-null unique column that appears on a SELECT clause that contains the DISTINCT keyword;
    generating a second set of one or more second tables in the query block that are not included in the first set;
    for each second table in the second set:

determining that the query block includes a filtering join with a first table in the first set and said each second table;

in response to determining that the query block includes a filtering join with a first table in the first set and said each second table, moving said each second table from the second set to the first set;

determining whether the second set is empty;

in response to determining that the second set is empty, removing the DISTINCT keyword and all aggregate functions from the query block;

wherein the method is performed by one or more computing devices.

15. A non-transitory computer-readable storage medium storing sequences of instructions for removing a GROUP BY clause from a query block of a query that, when executed by one or more processors, cause:

determining whether each table of a plurality of tables of the query block is qualified, wherein said each table is qualified when said each table satisfies at least one of two conditions that consist of:

said each table has a non-null unique column that appears on the GROUP BY clause, and there is a filtering join between said each table and another table of the plurality of tables that was determined to be qualified;

in response to determining that each table of the plurality of tables is qualified, rewriting the query to generate a rewritten query, wherein rewriting the query includes removing the GROUP BY clause from the query block.

16. The non-transitory computer-readable storage medium of claim 15, wherein the plurality of tables includes a first table with a first column, the sequences of instructions including instructions that, when executed by said one or more processors, cause determining that said first column is unique based on:

the first column having a UNIQUE index, a SELECT clause of a view only contains the first column qualified by a DISTINCT keyword, or the first column appears in a SELECT list of a view that includes a DISTINCT keyword that only contains the first column.

17. The non-transitory computer-readable storage medium of claim 15, wherein the plurality of tables includes a first table with a first column, the sequences of instructions including instructions that, when executed by said one or more processors, cause determining that said first column is non-null based on:

the first column is constrained by PRIMARY KEY RELY constraint, the first column is an argument of a IS NOT NULL predicate, the first column appears in a filter predicate, or the first column appears in a join predicate.

18. The non-transitory computer-readable storage medium of claim 15, wherein said query block includes at least one aggregate function;

wherein rewriting the query further includes removing the at least one aggregate function from the query block.

19. The non-transitory computer-readable storage medium of claim 15, wherein said query block includes a semi-join or anti join between two tables of the plurality of tables of the query block;

wherein each table of the two tables is not included in the determination of whether each table of the plurality of tables of the query block is qualified.

20. The non-transitory computer-readable storage medium of claim 15, wherein the plurality of tables includes a first table with a first column, wherein the filtering join comprises an equi-join between a particular column of the first table and a unique column of a second table.

21. The non-transitory computer-readable storage medium of claim 20, wherein the second table is an outer joined table and the first table is not an outer joined table.

22. A non-transitory computer-readable storage medium storing sequences of instructions for removing a DISTINCT keyword from a query block of a query that, when executed by one or more processors, cause:

determining whether each table of a plurality of tables of the query block is qualified, wherein said each table is qualified when said each table satisfies at least one of two conditions that consist of:

said each table has a non-null unique column that appears on a SELECT clause that contains the DISTINCT keyword; and there is a filtering join between said each table and another table of the plurality of tables that was determined to be qualified;

in response to determining that each table of the plurality of tables is qualified, rewriting the query to generate a rewritten query, wherein rewriting the query includes removing the DISTINCT keyword from the query block.

23. The non-transitory computer-readable storage medium of claim 22, wherein the plurality of tables includes a first table with a first column, the sequences of instructions including instructions that, when executed by said one or more processors, cause determining that said first column is unique based on:

the first column having a UNIQUE index, a SELECT clause of a view only contains the first column qualified by a DISTINCT keyword, or the first column appears in a SELECT list of a view that includes a DISTINCT clause that only contains the column.

24. The non-transitory computer-readable storage medium of claim 22, wherein the plurality of tables includes a first table with a first column, the sequences of instructions including instructions that, when executed by said one or more processors, cause determining that said first column is non-null based on:

the first column is constrained by PRIMARY KEY RELY constraint, the first column is an argument of a IS NOT NULL predicate, the first column appears in a filter predicate, or the first column appears in a join predicate.

25. The non-transitory computer-readable storage medium of claim 22, wherein the plurality of tables includes a first table with a first column, wherein the filtering join comprises an equi-join between a particular column of the first table and a unique column of a second table.

26. The non-transitory computer-readable storage medium of claim 22, wherein said query block includes a semi-join or anti-join between two tables of the plurality of tables of the query block;

wherein each table of the two tables is not included in the determination of whether each table of the plurality of tables of the query block is qualified.

27. A non-transitory computer-readable storage medium storing sequences of instructions for removing a GROUP BY clause from a query block of a query that, when executed by one or more processors, cause:
   generating a first set of one or more first tables that have a non-null unique column on the GROUP BY clause;
   generating a second set of one or more second tables in the query block that are not included in the first set;
   for each second table in the second set:
      determining that the query block includes a filtering join with a first table in the first set and said each second table;
      in response to determining that the query block includes a filtering join with a first table in the first set and said each second table, moving said each second table from the second set to the first set;
   determining whether the second set is empty;
   in response to determining that the second set is empty, removing the GROUP BY clause and all aggregate functions from the query block.

28. A non-transitory computer-readable storage medium storing sequences of instructions for removing a DISTINCT keyword from a query block of a query that, when executed by one or more processors, cause:
   generating a first set of one or more first tables that have a non-null unique column that appears on a SELECT clause that contains the DISTINCT keyword;
   generating a second set of one or more second tables in the query block that are not included in the first set;
   for each second table in the second set:
      determining that the query block includes a filtering join with a first table in the first set and said each second table;
      in response to determining that the query block includes a filtering join with a first table in the first set and said each second table, moving said each second table from the second set to the first set;
   determining whether the second set is empty;
   in response to determining that the second set is empty, removing the DISTINCT keyword and all aggregate functions from the query block.

* * * * *